Nov. 22, 1955
V. M. GILSTRAP
2,724,215
GLASS TEMPERING APPARATUS
Filed Oct. 11, 1952
2 Sheets-Sheet 1
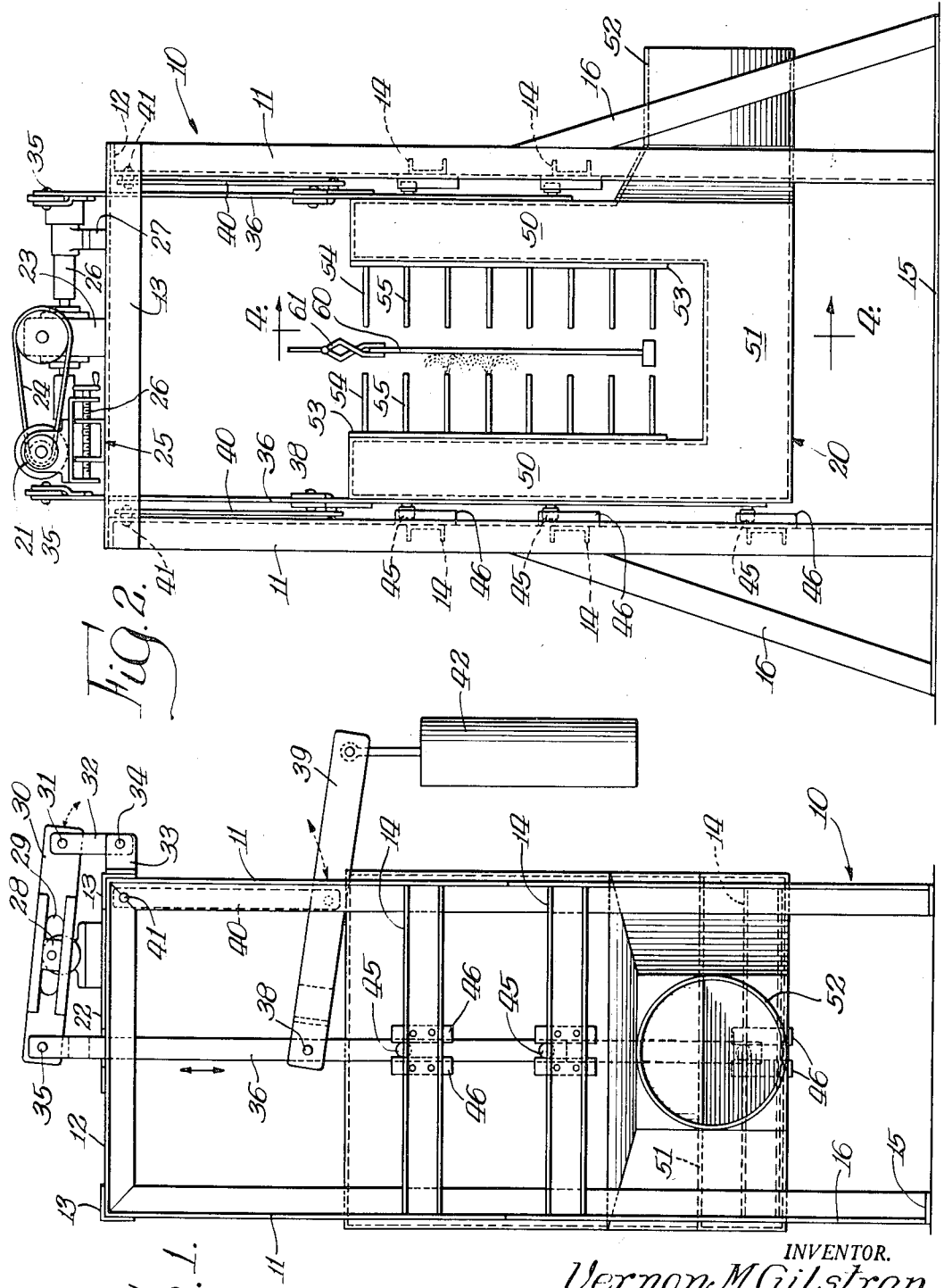
INVENTOR.
Vernon M. Gilstrap,
BY
ATTY'S.

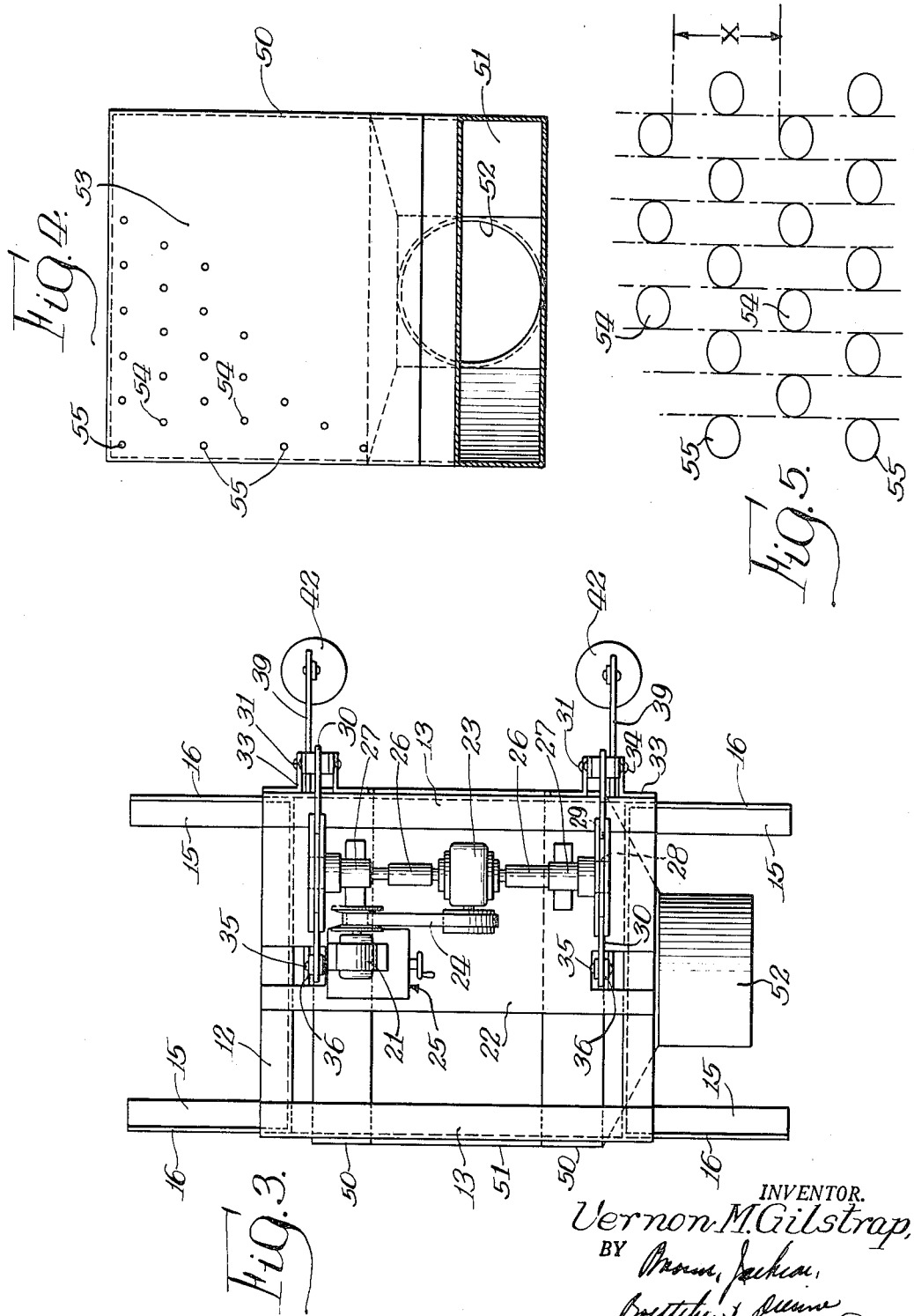

United States Patent Office 2,724,215
Patented Nov. 22, 1955

2,724,215

GLASS TEMPERING APPARATUS

Vernon M. Gilstrap, Chicago, Ill., assignor, by mesne assignments, to The American Securit Company, a corporation of Delaware.

Application October 11, 1952, Serial No. 314,251

5 Claims. (Cl. 49—45)

My present invention relates generally to apparatus for the hardening or tempering of glass articles and more particularly to an appaartus in which glass articles are to be hardened or tempered by the effect thereon of a plurality of impinging air streams.

It is recognized that air hardening of glass, such as glass plate or the like, may be effectively carried out by impinging the surfaces thereof with air whereby rapid cooling takes place bringing about a crystalline rearrangement of the glass structure and resulting in a marked hardening or tempering thereof to give the same improved physical characteristics. It is also a recognized fact that in such processes, wherein glass is "air-hardened," the delivery of air at fixed points on the glass has the effect of producing "impingement" marks or wavy areas on the glass surface which impair its appearance and light transmitting properties. Such impingement marks are especially prevalent in glass treated by air hardening apparatus wherein there is an absence of relative movement between the air streams and the glass article. Numerous devices have been presented in the past wherein various schemes for producing relative motion between the glass and the impinging air have been proposed, one of the more successful of such devices employing a blower head or cage having a plurality of nozzles from which emit a plurality of air streams directed in a manner to bathe the surface of the glass article with cooling air while impingement marks are avoided quite successfully by rotating the blower head or cage relative to the glass.

The present invention has for its main object the provision of a new and improved air hardening or tempering apparatus capable of successfully air hardening heated glass sheets or the like and employing a blower head rectilinearly reciprocated relative to the glass.

Another object of the present invention is to provide a new and improved blower head for an apparatus capable of air hardening or tempering glass whereby the surfaces of the glass treated are uniformly bathed by a plurality of cooling air streams directed thereto by a plurality of nozzle members disposed in such a manner that the nozzles may be reciprocated rectilinearly relative to the glass surfaces and along a fixed path without creating impingement marks thereon.

The above and further objects and features of my present invention will be recognized by one familiar with the art from the following detailed description and specification thereof and with reference to the accompanying drawings.

In the drawings:

Figure 1 is an end elevational view of an apparatus made in accordance with the teachings of my present invention;

Figure 2 is a side elevation of the apparatus illustrated in Figure 1;

Figure 3 is a top plan view of the apparatus illustrated in Figures 1 and 2 of the drawings;

Figure 4 is an enlarged partial sectional view taken substantially along line 4—4 of Figure 2 looking in the direction of the arrows and demonstrating the features of the blower head and the nozzle arrangement thereon; and Figure 5 is an enlarged partial view of a section of the blower head showing the details of the nozzle construction and arrangement employed in my new apparatus.

With reference to Figures 1 through 3 of the drawings, it will be recognized that my apparatus comprises a main frame indicated generally by numeral 10 and composed of a plurality of interconnected angle irons, such as the vertical post members 11 which form the four corners of the main frame 10 and are interconnected at their upper ends by horizontal cross bars 12 and 13. Post members 11 are further connected in pairs, intermediate their ends, by additional parallel channel cross bar members 14, 14. Since the vertical post members 11 are attached in pairs by the horizontal channel frame members 14, base plate members 15 are disposed transversely to channel members 14 at the lower ends of the post members 11 to insure a rigid structure for frame 10. Angularly disposed support channels 16 may also be utilized, if desired, to add base stability to the vertical upright frame 10.

A substantially U-shaped blower head assembly 20 is vertically disposed intermediate the pairs of upright post members 11, as shown in Figure 2 of the drawings. An electric motor 21 is mounted at the upper end of frame member 10 and atop a bed plate member 22 to provide for the power drive of blower head 20. Means for driving blower head 20 by motor 21 may be accomplished in any suitable manner, such as for example, by means of a suitable gear reducer transmission means 23 disposed centrally of plate member 22 and having driving connection with motor 21 by belt means 24. In this regard, it will be recognized that motor 21 is mounted to a movable carriage means, indicated generally by numeral 25, which is adapted, by means of a screw member 26, to provide tensioning of belt member 24. Dual shafts 26, 26 supported in bearings 27, 27 are driven by the gear reducer and transmission means 23. It will be understood that the rotational driving of the two shaft members 26 takes place simultaneously and that each shaft serves to drive a crank block member 28 pivotally supported in eccentric relation at its outer end. Block members 28 are each in turn received in slotted openings 29 of lever arm members 30, 30, each of which is pivoted, as at 31, to a link member 32 carried pivotally at its lower end, as at 34, by bracket means 33 secured to the frame 10 of the apparatus. The opposite end of each lever member 30 is connected by pivot means 35 to a vertically disposed strap member or link 36. The strap or link members 36 are each secured rigidly to opposite sides of the blower head assembly 20, as by welding or the like. The strap members are further connected intermediate their ends, by pivot means 38, to a counterweight lever 39 pivotally suspended, intermediate its ends, to the lower end of a cradle bar 40 which in turn is pivotally joined at its upper end, by pivot pin 41, to the framing 10 of the apparatus. The outer end of each of the counterweight bars 39 is provided with a pivotally depending counterweight 42. It will be understood that two such counterweights and linkage systems as described hereabove are provided, one being connected to the drive block 28 disposed at the outer end of each of the shaft means 26.

In order to insure that the linkage system described above will impart only vertical rectilinear motion to the blower head assembly 20, each of the strap members 36 is provided intermediate its ends and at spaced intervals along its length with roller members 45, 45 which are engageable between spaced guide blocks 46, 46 rigidly secured to the channel cross connecting bars 14 reaching intermediate the post frame members 11 in parallel relation to the side walls of the blower head assembly 20, as will be clearly recognized from Figures 1 and 2 of the drawings. With the above linkage system arranged as illustrated in Figures 1 and 2 of the drawings, it will be understood that cranking motion imparted to the lever members 30 will cause a reciprocal rocking action of link members 32 and cradle bars 40 so that, in effect, connection between the drive blocks 28 and the vertical strap members 36 is carried by a floating parallelogram linkage system. The floating movement of the linkage system, as well as the absolute vertical rectilinear motion of the blower connected to the strap members 36 is absolutely insured by virtue of the rolling movement of the roller members 45 between the guide blocks 46, fixed to the frame 10 of the apparatus.

The blower head assembly 20, as will be appreciated from a study of Figure 2 of the drawings in particular, is hollow and comprises a pair of vertical, opposed blower chambers 50, 50 interconnected at their lower ends by a horizontally disposed distribution chamber 51. Air inlet means 52 communicates with one side of distribution chamber 51 for connection to any suitable form of flexible hose leading from a blower or the like (not illustrated). The inside face of each of the lower chambers 50, 50 is provided with an apertured panel member 53 from which a plurality of tubular nozzle members 54 and 55 are extended outwardly. The length of the nozzle members 54 and 55 is such as to permit the passage of a sheet of glass 60, or the like, therebetween as it is suspended by any suitable type of clamp means 61, according to known and recognized practice. It will, of course, be understood by those familiar with the art that the suspended glass sheet 60 is normally conveyed, while in a heated condition, to the space intermediate the delivery ends of the opposed nozzle members for the rapid surface cooling thereof to effect a hardening and a reorganization of its crystalline structure.

With further reference to Figures 4 and 5 of the drawings, it will be recognized that the nozzle members 54 and 55 are positioned in a symmetrical checker-board pattern over the face of each apertured face plate 53 of the blower chambers 50, and that in the preferred form of my invention each of the nozzle members 54 and 55 is slightly elliptical in end cross section, substantially as illustrated in Figure 5 of the drawings. It will be noted also that alternate vertical rows of nozzles 55 are disposed in staggered relation to intermediate rows of nozzles 54 and that the uniform pattern array thus formed gives even and adequate distribution of air to opposite faces of a glass sheet 60 positioned between the two blower chambers 50, 50. Further, nozzles 54 are positioned so that the peripheral lateral limits thereof terminate at a line passing tangentially to the peripheral lateral limits of adjacent nozzles 55. It will be noted that this tangential arrangement of adjacent rows of nozzles is designed to insure complete lateral coverage of the glass surface being supplied with air by the nozzles. Thus I avoid having any surface areas on the glass which are not subject to the blast of an air stream.

Further, the vertical distance between adjacent nozzles of the same vertical row can be determined at a dimension X, as illustrated. In order to avoid vertical overlap of the air streams emitting from the nozzle members during the vertical reciprocal rectilinear movement of the blower assembly 20, I prefer that the vertical movement of the blower assembly be limited to a distance slightly less than the dimension X so that the vertical limits of the individual glass surface areas supplied by the nozzles are substantially tangential.

I have found that with the disposition of the nozzle members according to the above described checker-board pattern and the regulation of the vertical reciprocation of the blower head through a distance slightly less than the vertical spacing between adjacent nozzles of the same vertical row, impingement marks due to overlap of the air streams during the vertical reciprocation of the blower head is substantially eliminated. With this arrangement I can successfully bring about effective air hardening of glass sheet material or like glass articles while restricting the movement of the blower head to simple rectilinear reciprocation, which motion serves to effectively distribute the impinging air streams over the entire surface of the glass. Further it will be appreciated and understood that the concepts of rectilinearly reciprocating the blower head may be carried out with like facility by moving the head in a horizontal or vertical reciprocating path or any other direction of linear motion as desired.

It also will be recognized, from Figure 2 of the drawings in particular, that the nozzle members 54 and 55 of the blower chambers 50, 50 extend inwardly from such chambers toward the glass to be treated a sufficient distance to permit the air to strike the glass surface, reverse its direction and easily escape without setting up a pressure area and unwanted turbulence adjacent the surface of the glass. This spacing of the glass from the face of the blower chambers 50, 50 or that is the elongation of the nozzle members 54 and 55 permits a more rapid and efficient cooling of the glass than is possible if the chambers 50, 50 are placed in closer proximity to one another and the elongated nozzle members protruding therefrom are eliminated.

Thus it will be understood that I have provided a new and improved air hardening apparatus especially adapted for the tempering and air hardening treatment of sheet glass or like material. Further, it will be appreciated that while I have herein illustrated and described the features and concepts of my invention as related to a particular embodiment thereof, various changes, modifications and substitutions of equivalents may be made therein without departing from the spirit and scope of my invention. Therefore, I do not wish to be limited to the specific embodiment of my invention herein illustrated and described except as may appear in the following appended claims.

I claim:

1. Apparatus for producing air tempered or hardened glass, comprising in combination, a hollow air chamber member, a plurality of spaced, hollow nozzle members extending outwardly of one face of said chamber member and communicating with the hollow interior thereof, said nozzle members being arranged according to a symmetrical checker-board pattern in which rows of nozzles are substantially tangential, means supplying said chamber member with pressurized air for distribution via said nozzle members to a surface of a stationary glass article to be treated, and power driven linkage means for rectilinearly reciprocating said chamber and nozzle members relative to the glass for a distance slightly less than the distance between adjacent nozzles in said rows.

2. For use in air hardening or tempering sheet glass or the like, apparatus comprising, a substantially U-shaped blower head assembly having a pair of vertically extending, interconnected chamber portions separated laterally to provide for the positioning of a glass sheet therebetween, a plurality of spaced nozzle members communicating with the interior of each of said chamber portions and extending outwardly of opposed faces thereof so as to be located on opposite faces of said glass, said nozzle members being disposed in uniformly staggered and spaced rows to form a checkerboard nozzle pattern with vertical rows thereof disposed tangential, a linkage system having driving connection with said head assembly, said linkage system being constructed and arranged to reciprocate the head assembly rectilinearly a distance substantially equal to the spacing between adjacent nozzles of said vertical rows, and means for driving said linkage system.

3. For use in air hardening sheet glass or the like, the combination comprising a hollow U-shaped blower head assembly having a pair of laterally spaced upright hollow chamber portions, means supplying pressurized air to said chamber portions, a plurality of nozzle members arranged in checkerboard pattern on each of said chamber portions and protruding outwardly of adjacent faces thereof, said nozzle member serving to deliver air from said chamber portions to opposite faces of a glass sheet positioned therebetween, and drive means for reciprocating said head assembly rectilinearly a distance approximating the spacing between adjacent nozzles of the same row thereby to increase the area of said glass directly supplied with air by each of said nozzles, the linear displacement of said head assembly during its reciprocation and the linear spacing between said adjacent nozzles being such that the areas at the face of the glass supplied by the individual nozzles are substantially tangential.

4. The combination as set forth in claim 3 wherein said drive means comprises a motor driven parallelogram linkage system designed to insure pure rectilinear reciprocation of said head assembly.

5. An apparatus of the class described for use in air hardening sheet glass and the like, comprising in combination, a hollow U-shaped blower head assembly having a pair of spaced hollow chamber portions interconnected at one end by a transversely disposed distribution portion, said chamber portions being spaced laterally to provide for the positioning of a sheet of glass therebetween, means for holding a glass sheet stationary between said chamber portions, a plurality of spaced nozzle members projecting from opposed adjacent faces of said chamber portions and communicating with the hollow interiors thereof, means for supplying pressurized air to each of said chamber portions for distribution to the said glass through said nozzle members, said nozzle members being disposed in checkerboard pattern comprising uniformly staggered rows of spaced nozzle members of which certain rows thereof are parallel and tangential and the other rows are parallel spaced and disposed transversely of said certain rows, a linkage system connected to said blower head assembly for reciprocating the same a distance slightly less than the spacing between adjacent nozzles in said certain rows thereof, means for driving said linkage system, and guide means for restricting the reciprocation of said head assembly to pure rectilinear motion.

References Cited in the file of this patent

UNITED STATES PATENTS

| 1,970,730 | Black | Aug. 21, 1934 |
| 2,131,406 | Mosmieri et al. | Sept. 27, 1938 |

FOREIGN PATENTS

| 504,191 | Great Britain | Apr. 20, 1939 |
| 556,558 | Great Britain | Oct. 11, 1943 |